United States Patent

Kimura et al.

[15] 3,665,432

[45] May 23, 1972

[54] MAGNETIC TAPE UNIT READING SYSTEM

[72] Inventors: Takashi Kimura, Yokohama; Kazuo Kumagai, Kawasaki; Kaoru Kanda, Yokohama, all of Japan

[73] Assignee: Fujitsu Limited, Kawasaki, Japan

[22] Filed: Nov. 24, 1970

[21] Appl. No.: 92,418

[30] Foreign Application Priority Data

Dec. 8, 1969 Japan....................................44/98502
Dec. 23, 1969 Japan..................................44/104017

[52] U.S. Cl...................................340/174.1 H, 340/174.1 B
[51] Int. Cl..........................................G11b 5/00, G11b 27/36
[58] Field of Search..............340/146.1 F, 174.1 B, 174.1 H, 340/174.1 J; 179/100.2 S

[56] References Cited

UNITED STATES PATENTS 3,423,744 1/1969 Gerlach et al....................340/174.1 H

*Primary Examiner*—Bernard Konick
*Assistant Examiner*—J. Russell Goudeau
*Attorney*—Curt M. Avery, Arthur E. Wilfond, Herbert L. Lerner and Daniel J. Tick

[57] ABSTRACT

An all 0 byte detector detects from read data in a magnetic tape unit reading system a byte having data bits which are all 0. An all 1 byte detector detects from the read data a byte having data bits which are all 1. An addendum detector connected to the outputs of the all 0 byte detecting means and the all 1 byte detecting means detects all 0 and all 1 bytes as a virtual addendum to the read data by detecting the all 0 and all 1 bytes of the all 0 byte detector and the all 1 byte detector. A timer connected to an output of the addendum detector times a specific predetermined period of time starting with the detection of the data as a virtual addendum by the addendum detector. A byte counter connected to the timer counts the bytes of the read data. An end data checking circuit connected to the output of the byte counting means and to an output of the all 0 byte detector determines if an all 0 byte is detected by the all 0 byte detector during the specific period of time. An output is connected to the output of the end data checking circuit.

5 Claims, 15 Drawing Figures

ERROR TRACK HOLDING CIRCUIT 78

ERROR DATA HOLDING CIRCUIT 112

MAGNETIC TAPE UNIT READING SYSTEM

DESCRIPTION OF THE INVENTION

The invention relates to a magnetic tape unit reading system. More particularly, the invention relates to a system for correcting data reading errors in a phase encoding recording system of a magnetic tape unit utilized as an external auxiliary memory of data processing equipment.

In a known preamble or addendum detecting circuit of a known data processing system, the tape speed has a variation of about ±10 percent and there is a skew at the end of a data block. It must therefore be considered that there is a skew over about three bytes. When a monostable multivibrator is utilized in the period of time between the reading of all 1 and all 0 and the detection of the interblock gap, the tape speed variation must be taken into consideration. A byte is used herein to indicate a single group of bits processed together. A byte may comprise a variable number of bits. Since the tape speed variation must be taken into consideration, even if a period of time equivalent to ten or more bytes is provided for the detection of the interblock gap, if a dropout occurs at a position before the end of the data block by 10 or more bytes and an all 0 byte is detected after the detection of an all 1 byte, it may be erroneously determined that the addendum is reached. This erroneous determination may not be checked by the error checking or end data checking in the period of time for the detection of the interblock gap. There is no all 0 byte in the data block, but there may be an all 0 byte in the data block after the occurrence of a dropout. There is thus a possibility for an erroneous determination that a data block is terminated or ended, when the data is not actually terminated at the position before the end of said data block by 10 or more bytes. In this case, the all 0 byte next-succeeding the all 1 byte is generated by the dropout, but this cannot be regarded as the dropout, so that the data reading becomes unreliable.

The principal object of the invention is to provide a new and improved magnetic tape unit reading system.

An object of the invention is to overcome the disadvantages of known data reading systems.

An object of the invention is to provide reliable data reading.

Reliable data reading is provided by the reading system of the invention by providing a circuit arrangement wherein when an all 0 byte is detected after the detection of an all 1 byte, all 0 bytes of a constant number succeeding the all 0 byte are supervised. If a signal 1 is detected in the all 0 bytes of a constant number, it is determined that the addendum is not yet reached, but there is a data error. In such case, after the detection of the interblock gap, the data block is reread from the beginning. The utilization of the circuit arrangement of the invention permits the elimination of the aforementioned possibility of mistaking part of the data block for the addendum when an all 0 byte is detected after the detection of an all 1 byte.

In accordance with the invention, all 0 bytes of a constant number are supervised as hereinbefore described. If the interblock gap can be detected after a constant period of time, the all 0 bytes of a constant number are regarded as the addendum. In this case, there is no error in the data, and the data may be transmitted. If the interblock gap cannot be detected after the period of time has elapsed, it is determined that there is an end data error and the data block is reread. This further reduces the possibility of the aforedescribed error.

There is still a possibility that if a dropout occurs again in the same track, such data will never be read. Another object of the invention is to provide normal reading of the data. In accordance with the invention, when an error signal is generated in the circuit arrangement, it is determined on the basis of the content of the error signal whether the reread addendum is the real addendum or not. Even if there is data which is erroneously determined due to a dropout, the data may be read normally. This may be achieved, in accordance with the invention, by providing a reading system in a magnetic tape unit of a data processing system, which data processing system comprises the magnetic tape unit, a magnetic tape controller and a central processor unit.

The driving of the magnetic tape unit is stopped by the detection of an addendum or a preamble comprising an all 1 byte and all 0 bytes indicating the end of a data block in a magnetic tape in the magnetic tape unit. When part of the data block is mistaken for the addendum or the preamble, due to error in the magnetic tape or the readout head, an end data error signal is produced or generated in accordance with the content of the data read subsequently. The end data error signal is transmitted to the central processor unit and is transmitted again to the magnetic tape controller in the rereading of the data. The end data error signal is collated with the reread data and the succeeding data is continuously read without utilizing the bytes which cause the production of the end data error signal to indicate the addendum or the preamble. The addendum which satisfies the condition of the addendum or the preamble may be detected.

An object of the invention is to provide a magnetic tape unit reading system which functions with accuracy, efficiency, effectiveness and considerable reliability.

In accordance with the invention, a magnetic tape unit reading system comprises input means for supplying read data. All 0 byte detecting means having an input coupled to the input means and outputs detects from the read data a byte having data bits which are all 0. All 1 byte detecting means having an input coupled to the input means and an output detects from the read data a byte having data bits which are all 1. Addendum detecting means having inputs connected to the outputs of the all 0 byte detecting means and the all 1 byte detecting means and outputs detects all 0 and all 1 bytes as a virtual addendum to the read data by detecting the all 0 and all 1 bytes of the all 0 byte detecting means and the all 1 byte detecting means. Timing means having an input connected to an output of the addendum detecting means and an output times as specific predetermined period of time starting with the detection of the data as a virtual addendum by the addendum detecting means. Byte counting means having an input connected to the timing means, an input coupled to the input means and an output counts the bytes of the read data. End data checking means having an input connected to the output of the byte counting means, an input connected to an output of the all 0 byte detecting means and outputs determine if an all 0 byte is detected by the all 0 byte detecting means during the specific predetermined period of time. Output means is connected to the output of the end data checking means. Error data means supplies error data. +1 adding means having an input connected to an output of the end data checking means, an input coupled to the error data means and an output connected to the output means adds 1 to the error data if the addendum detecting means fails to detect all 0 and all 1 bytes as a virtual addendum and stores the new sum when the end data checking means determines that no all 0 byte is detected by the all 0 byte detecting means during the specific predetermined period of time. Dropout detecting means having an input connected to the input means and an output detects a dropout on a magnetic tape when the read data supplied by the input means is read from a magnetic tape. Error track holding means having an input connected to the output of the dropout means, an input coupled to the error data means and an output connected to an input of the addendum detecting means, an input of the all 0 byte detecting means and an input of the all 1 byte detecting means stores data of a portion where there is a dropout on a magnetic tape and determines coincidence of data of a portion having a dropout detected by the dropout detecting means and the error data supplied by the error data means. Error data holding means having an input coupled to the error data means, an input connected to the addendum detecting means, an output connected to the addendum detecting means and an output connected to an input of the +1 adding means stores error data supplied by the error data means and data from the error track holding means and subtracts 1 from the error data each time the addendum detecting means detects all 0 and all 1 bytes as a virtual addendum.

The output means comprises end data error signal generating means having an input connected to an output of the end data checking means, an input connected to the output of the error track holding means, an input connected to the output of the +1 adding means and an output for transmitting the signal of the +1 adding means and the detected error track signal of the dropout detector for processing and return to the error data means as an end data error signal.

The error track holding means comprises first memory means and second memory means for storing the track having a dropout. The first memory means stores the number of the track having a dropout and the second memory means stores error data of the portion having the dropout as transmitted by the end data error signal generating means and returned to the error data means.

The error data holding means comprises memory means for storing signals from the addendum detecting means and data from the error data means. The memory means stores data received directly from the error data means and includes means for making the content of the memory means 1 if a signal is received from the addendum detecting means when no data is stored in the memory means and means for adding 1 to the content of the memory means and for storing the result of the addition in the memory means if a signal is received from the addendum detecting means when specified data is stored in the memory means.

In order that the invention may be readily carried into effect, it will now be described with reference to the accompanying drawings, wherein.

Figure 1:
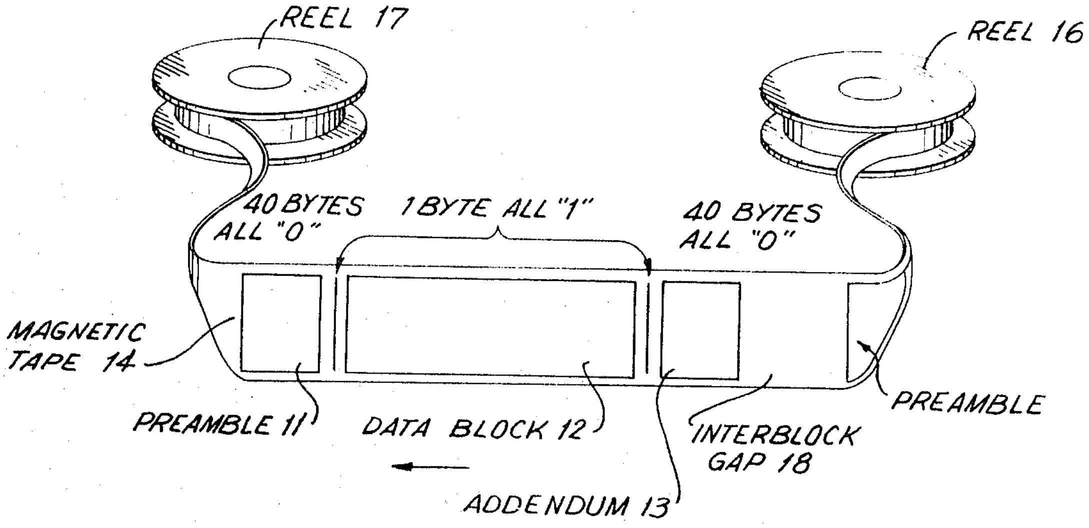
FIG. 1 PRIOR ART
FIG. 1 is a schematic perspective view of a magnetic tape having data recorded thereon.

In a conventional phase encoding recording system, as shown in FIG. 1, a preamble 11 is recorded next-preceding each data block 12 and an addendum 13 is recorded next-succeeding each data block 12. A plurality of data blocks, of which only one is shown in FIG. 1, are recorded on magnetic tape 14. The magnetic tape moves in the direction of an arrow 15 from a reel 16 to a reel 17.

Each of the preamble 11 and the addendum 13 comprises 40 bytes all 0. One byte all 1 is recorded between the preamble 11 and the data block 12 and between said data block and the addendum 13. In the reading operation, a data block 12 is read, one byte all 1 is read, one byte all 0 is read, and then an interblock gap 18 is detected. The reading operation is completed or terminated by the detection of the interblock gap 18. The interblock gap is the gap between adjacent data blocks on the magnetic tape 14, on which no data is recorded.

Figure 2:
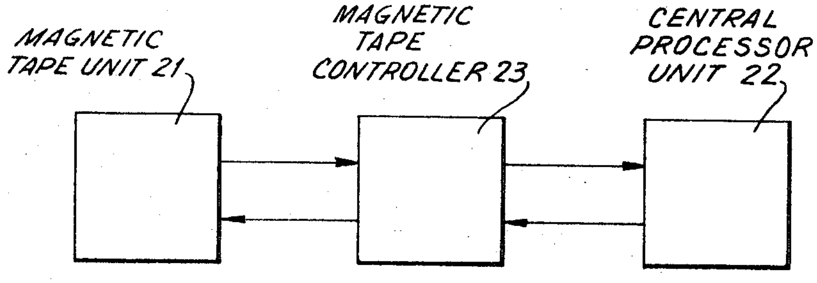
FIG. 2 PRIOR ART
FIG. 2 is a block diagram of a data processing system including the magnetic tape unit of the invention.
Figure 3:
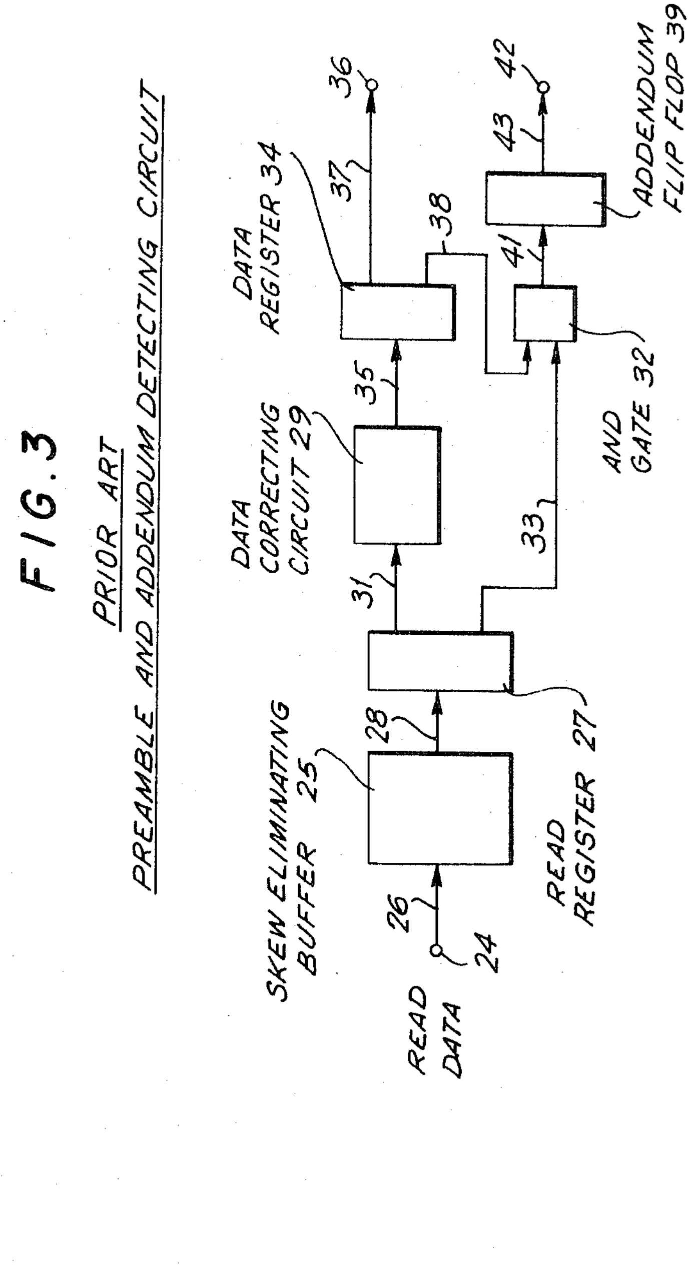
FIG. 3 is a block diagram of a known preamble and addendum detecting circuit.

As shown in FIG. 2, a magnetic tape unit 21 is usually connected to a central processor unit 22 via a magnetic tape controller 23. An addendum or a preamble is detected by a preamble and addendum detecting circuit of known type, as shown in FIG. 3. The preamble and addendum detecting circuit of known type is included in the magnetic tape unit 21 or the magnetic tape controller 23.

In the known preamble and addendum detecting circuit of FIG. 3, data read from the magnetic tape 14 of FIG. 1 is supplied to an input terminal 24. The input terminal 24 is connected to the input of a skew eliminating buffer 25 via a lead 26. The output of the skew eliminating buffer 25 is connected to the input of a read register 27 via a lead 28. One output of the read register 27 is connected to the input of a data correcting circuit 29 via a lead 31. The other output of the read register 27 is connected to a first input of an AND gate 32 via a lead 33.

The output of the data correcting circuit 29 is connected to the input of a data register 34 via a lead 35. An output of the data register 34 is connected to a first output terminal 36 via a lead 37. Another output of the data register 34 is connected to the second input of the AND gate 32 via a lead 38. The output of the AND gate 32 is connected to the input of an addendum flip flop 39 via a lead 41. The output of the addendum flip flop 39 is connected to a second output terminal 42 via a lead 43.

The skew eliminating buffer 25 functions to eliminate the skew of the read data, since date bits of one byte are scarcely recorded linearly and longitudinally on a magnetic tape in a phase encoding system, so that there is more or less shift. The shift is the skew. The read register 27 records the read data with the skew eliminated. The data register 34 records the corrected data from the data correcting circuit 29. The addendum flip flop 39 is set when an addendum is detected.

Data recorded in a phase encoding system are read irregularly due to the skew. Each byte of the read data therefore has its skew eliminated by the skew eliminating buffer 25, so that the byte may not be mixed with the other bytes. The bytes having the skew eliminated are successively supplied to the read register 27, wherein the parity check is performed. The bytes are then supplied from the read register 27 to the data register 34 via the data correcting circuit 29.

It may be assumed that the data of the data register 34 is all 1 and that the data of the read register 27 is all 0. The AND gate 32 is then switched to its conductive condition and the addendum flip flop 39 is set. Data transfer is controlled by the signal from the addendum flip flop 39 and indicates that an addendum is transmitted at the time. When an interblock gap is detected after the termination of a constant period of time, it is determined that a data block is completed or terminated. If an interblock gap cannot be detected at such time, it is determined that there is an end data error.

Figure 4:
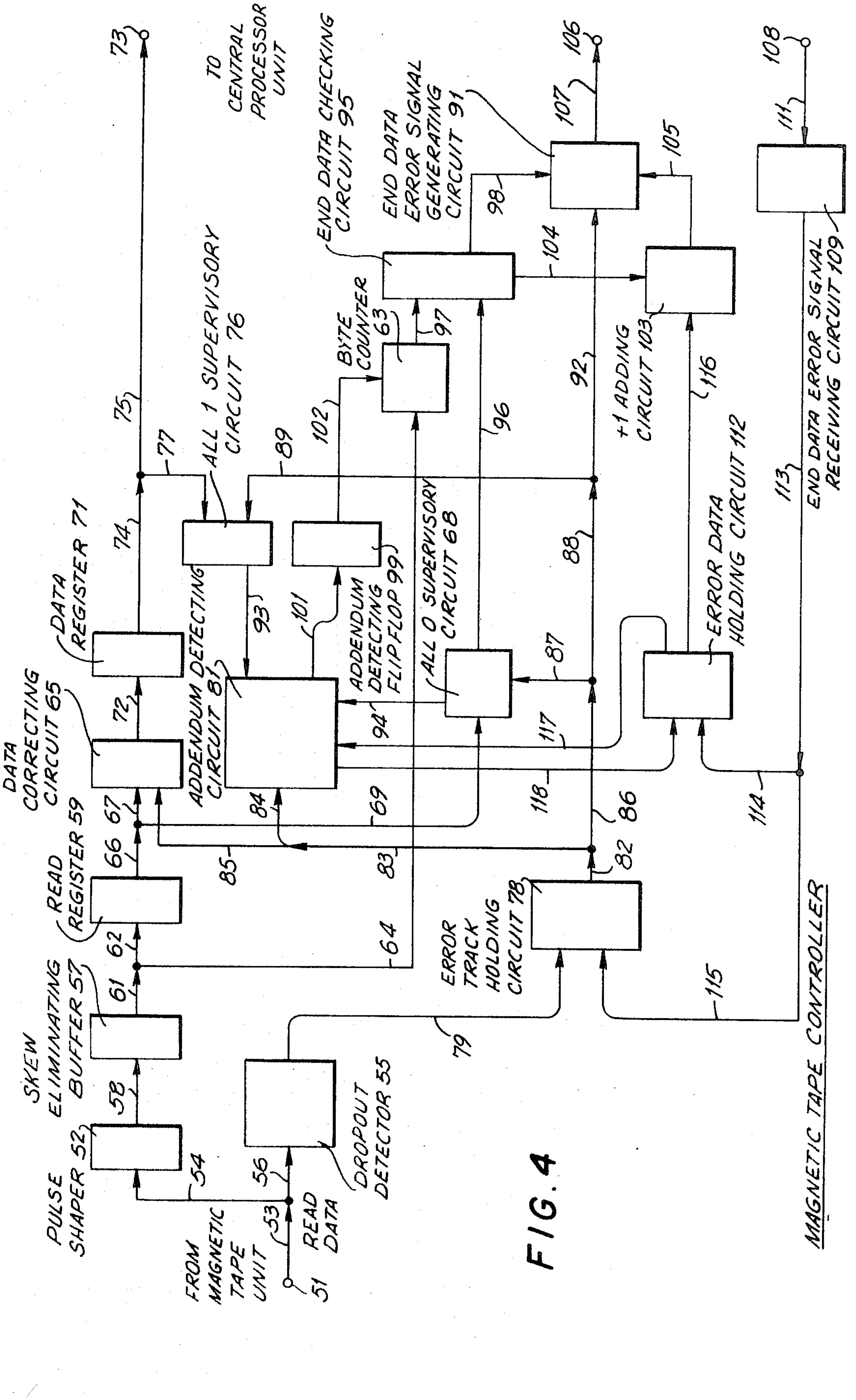
FIG. 4 is a block diagram of an embodiment of the magnetic tape unit reading system of the invention.

The magnetic tape unit reading system of the invention will now be described with reference to FIGS. 4 to 15. FIG. 4 is an embodiment of the magnetic tape unit reading system of the invention. In FIG. 4, read data from the magnetic tape unit is supplied to an input terminal 51. The input terminal 51 is connected to the input of a pulse shaper 52 via a lead 53 and a lead 54. The input terminal 51 is connected to the input of a dropout detector 55 via the lead 53 and a lead 56. The output of the pulse shaper 52 is connected to the input of a skew eliminating buffer 57 via a lead 58. The output of the skew eliminating buffer 57 is connected to the input of a read register 59 via leads 61 and 62, and is also connected to an input of a byte counter 63 via the lead 61 and a lead 64.

The output of the read register 59 is connected to the input of a data correcting circuit 65 via leads 66 and 67, and is also connected to an input of an all 0 supervisory circuit 68 via the lead 66 and a lead 69. The output of the data correcting circuit 65 is connected to the input of a data register 71 via a lead 72. The output of the data register 71 is connected to a first output terminal 73 via leads 74 and 75, and is also connected to an input of an all 1 supervisory circuit 76 via the lead 74 and a lead 77.

The output of the dropout detector 55 is connected to an input of an error track holding circuit 78 via a lead 79. The output of the error track holding circuit 78 is connected to an input of an addendum detecting circuit 81 via leads 82, 83 and 84. The output of the error track holding circuit 78 is connected to another input of the data correcting circuit 65 via the leads 82 and 83 and a lead 85. The output of the error track holding circuit 78 is connected to another input of the all 0 supervisory circuit 68 via the lead 82, a lead 86 and a lead 87. The output of the error track holding circuit 78 is connected to another input of the all 1 supervisory circuit 76 via the leads 82 and 86 and leads 88 and 89. The output of the error track holding circuit 78 is connected to an input of an end data error signal generating circuit 91 via the leads 82, 86 and 88 and a lead 92.

The output of the all 1 supervisory circuit 76 is connected to another input of the addendum detecting circuit 81 via a lead 93. An output of the all 0 supervisory circuit 68 is connected to another input of the addendum detecting circuit 81 via a lead 94. Another output of the all 0 supervisory circuit 68 is connected to an input of an end data checking circuit 95 via a lead 96. The output of the byte counter 63 is connected to another input of the end data checking circuit 95 via a lead 97. An output of the end data checking circuit 95 is connected to an input of the end data error signal generating circuit 91 via a lead 98.

An output of the addendum detecting circuit 81 is connected to the set input of an addendum detecting flip flop 99 via a lead 101. The set output of the addendum detecting flip flop 99 is connected to another input of the byte counter 63 via a lead 102. Another output of the end data checking circuit 95 is connected to an input of a +1 adding circuit 103 via a lead 104. The output of the +1 adding circuit 103 is connected to another input of the end data error signal generating circuit 91 via a lead 105. The output of the end data error signal generating circuit 91 is connected to a second output terminal 106 via a lead 107.

A second terminal 108 is connected to the input of an end data error signal receiving circuit 109 via a lead 111. The output of the end data error signal receiving circuit 109 is connected to an input of an error data holding circuit 112 via leads 113 and 114, and is connected to another input of the error track holding circuit 78 via the lead 113 and a lead 115. An output of the error data holding circuit 112 is connected to another input of the +1 adding circuit 103 via a lead 116. Another output of the error data holding circuit 112 is connected to another input of the addendum detecting circuit 81 via a lead 117. Another output of the addendum detecting circuit 81 is connected to another input of the error data holding circuit 112 via a lead 118.

In FIG. 4, the first input terminal 51 is connected to a magnetic tape unit and the first and second output terminals 73 and 106 are connected to a central processor unit. Neither the magnetic tape unit nor the central processor unit is shown in FIG. 4. In the circuit arrangements hereinafter described, one column comprises three bits, consisting of one parity bit and two data bits. The invention is, of course, not limited to this, however. Ordinarily, in order to increase the reliability of the data, one check bit is provided in one column in the data on the magnetic tape. By changing the content of the check bit, the total number of bits of 1 in one column comprising the check bit and data bits is always made an odd number.

Figure 5:
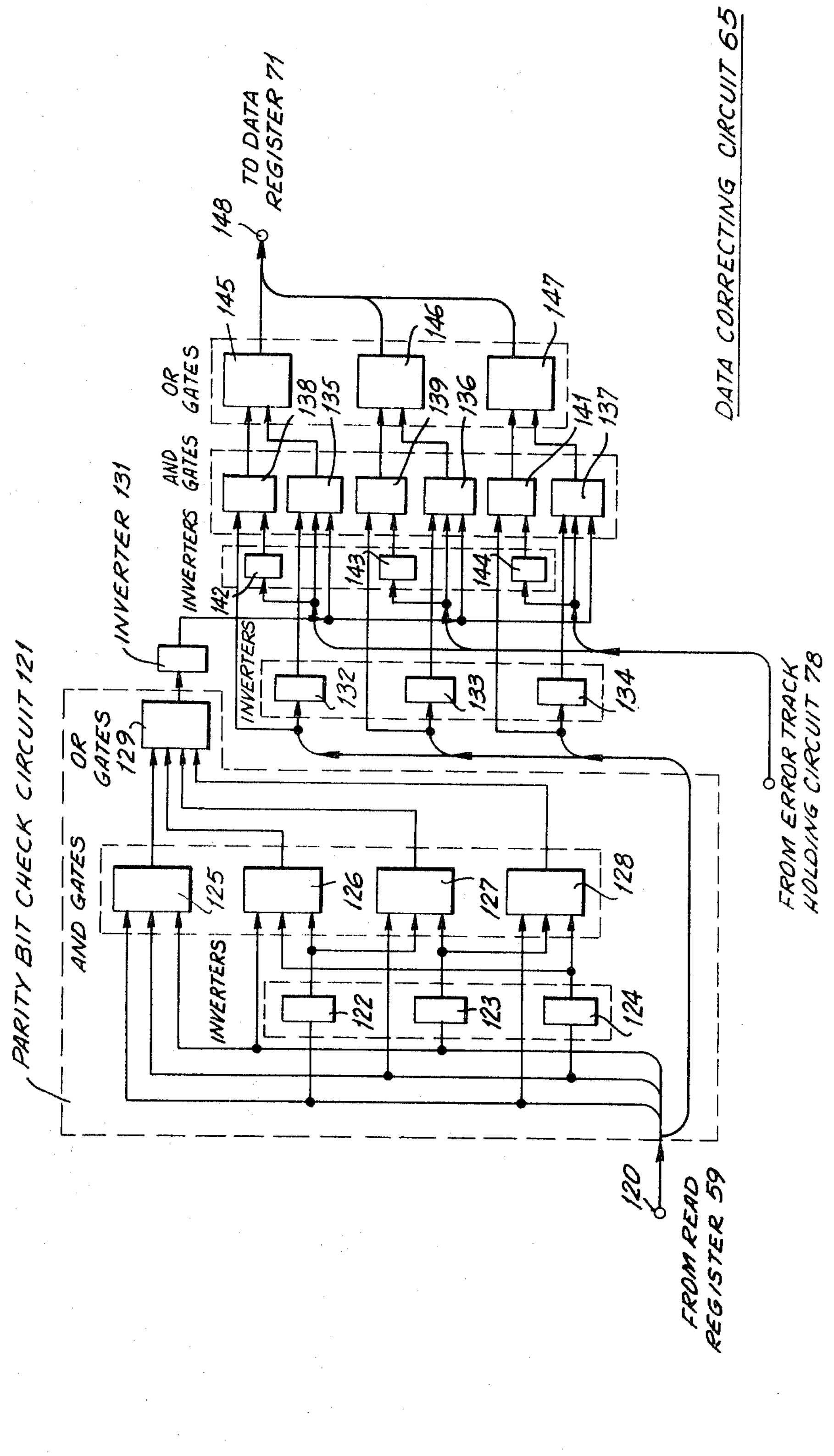
FIG. 5 is a block diagram of a data correcting circuit which may be utilized in the magnetic tape unit reading system of FIG. 4.

FIG. 5 illustrates a data correcting circuit which may be utilized as the data correcting circuit 65 of FIG. 4. In FIG. 5, upon the initiation of the reading of the data, the read data is supplied from the read register 59 (FIG. 4) to the data correcting circuit 65 via an input terminal 120. The data, which is in columns, is supplied in succession. The columns of data are first supplied to a parity bit check circuit 121. The parity bit check circuit 121 comprises a plurality of inverters 122, 123 and 124, a plurality of AND gates 125, 126, 127 and 128 and an OR gate 129. If the parity check cannot be performed satisfactorily, that is, if there is an error in the data, a signal 1 is transferred by an inverter 131 connected to the output of the OR gate 129 of the parity bit check circuit 121.

If a signal indicating an error track is transmitted from the error track holding circuit 78 (FIG. 4), the coincidence of the signal produced by the inverter 131, the signal indicating an error track and a signal produced by each of a plurality of inverters 132, 133 and 134 switches a plurality of AND gates 135, 136 and 137 to their conductive condition. The inverters 132, 133 and 134 convert the data signals to no signals and convert no data signals to signals. When the AND gates 135, 136 and 137 are switched to their conductive condition, or when a plurality of AND gates 138, 139 and 141 are switched to their conductive condition, the corrected data is transmitted to the data register 71. If there is no error in the data, the read data is directly supplied to the AND gates 138, 139 and 141 and a plurality of inverters 142, 143 and 144 convert no signal from the error track holding circuit 78 (FIG. 4), which indicates that there is no error track, to a signal, so that said AND gates are switched to their conductive condition. The data from the read register 59 is thus transferred by the AND gates 138, 139 and 141 to the data register 71 without modification. The outputs of the AND gates 138, 135, 139, 136, 141 and 137 are connected to corresponding inputs of a plurality of OR gates 145, 146 and 147. The outputs of the OR gates 145, 146 and 147 are connected to an output terminal 148, to which the data register 71 is connected.

Figure 6:
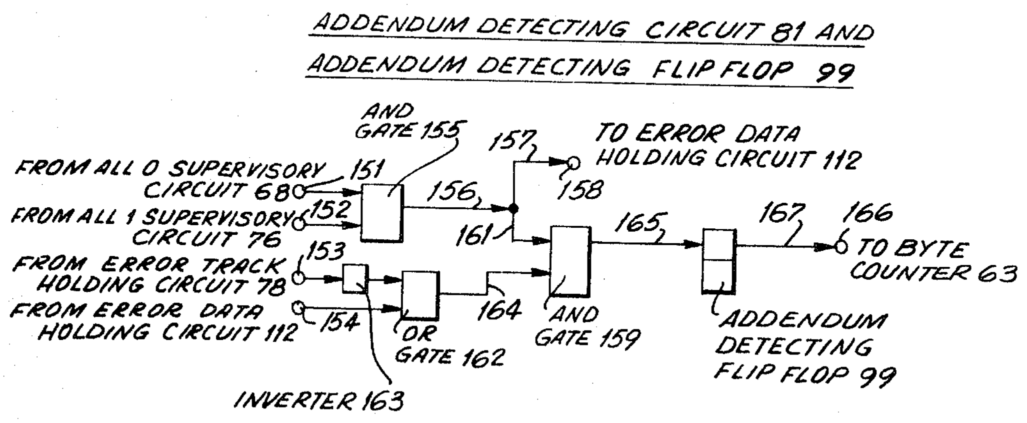
FIG. 6 is a block diagram of an addendum detecting circuit and an addendum detecting flip flop which may be utilized in the magnetic tape unit reading system of FIG. 4.

FIG. 6 shows an embodiment of an addendum detecting circuit and addendum detecting flip flop which may be utilized as the addendum detecting circuit 81 and the addendum detecting flip flop 99 of FIG. 4. In FIG. 6, signals are supplied from the all 0 supervisory circuit 68 of FIG. 4 to an input terminal 151 and signals are supplied from the all 1 supervisory circuit 76 of FIG. 4 to an input terminal 152. Signals are supplied from the error track holding circuit 78 of FIG. 4 to an input terminal 153 and signals are supplied from the error data holding circuit 112 to an input terminal 154. When signals are supplied to the input terminals 151 and 152, an AND gate 155 is switched to its conductive condition and transfers a signal to the error data holding circuit 112 of FIG. 4 via leads 156 and 157 indicating that all 1 and all 0 data has been read.

The error data holding circuit 112 of FIG. 4 is connected to the output of the AND gate 155 via an output terminal 158. The output of the AND gate 155 is also connected to a first input of an AND gate 159 via the lead 156 and a lead 161. The input terminal 153 is connected to a first input of an OR gate 162 via an inverter 163. The input terminal 154 is connected to the second input of the OR gate 162. The output of the OR gate 162 is connected to the second input of the AND gate 159 via a lead 164. The output of the AND gate 159 is connected to the set input of the addendum detecting flip flop 99 via a lead 165. The set output of the addendum detecting flip flop 99 is connected to an output terminal 166 via a lead 167. The byte counter 63 of FIG. 4 is connected to the output terminal 166.

When there is no coincidence indicated in the error track holding circuit 78 (FIG. 4) of error track data from the end data error signal receiving circuit 109 (FIG. 4) and a signal from the dropout detector 55 (FIG. 4), or when the number of times of erroneous detection of addenda due to dropouts is not indicated by the error track holding circuit 78, all 1 and all 0 data is regarded as data resembling the addendum and signals are transmitted to the set input of the addendum detecting flip flop 99 via the AND gate 159. When the addendum detecting flip flop 99 is set, it produces a signal which is supplied to the byte counter 63 via the output terminal 166.

Figure 7:
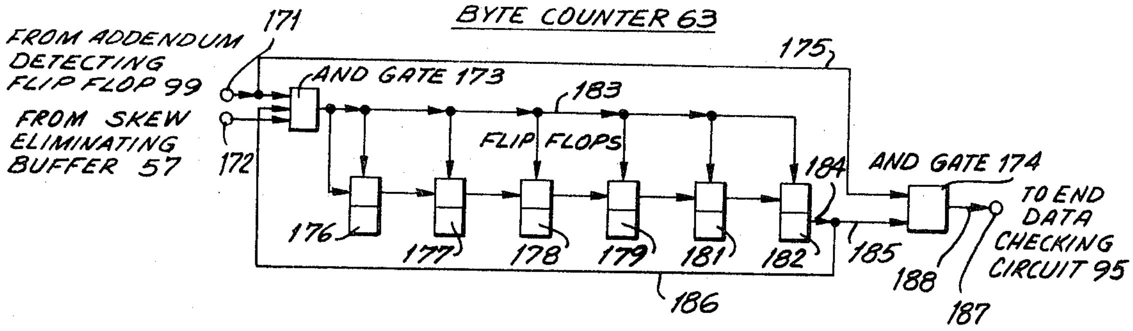
FIG. 7 is a block diagram of a byte counter which may be utilized in the magnetic tape unit reading system of FIG. 4.

FIG. 7 illustrates an embodiment of a byte counter which may be utilized as the byte counter 63 of FIG. 4. The addendum detecting flip flop 99 of FIG. 4 is connected to an input terminal 171. The skew eliminating buffer 57 is connected to an input terminal 172. The input terminal 171 is connected to a first input of an AND gate 173 and the input terminal 172 is connected to a second input of said AND gate. The input terminal 171 is connected to a first input of an AND gate 174 via a lead 175. The output of the AND gate 173 is connected in common to a plurality of flip flops 176, 177, 178, 179, 181 and 182, and to the set input of the flip flop 176 via a common lead 183.

The set output of the flip flop 176 is connected to the set input of the flip flop 177. The set output of the flip flop 177 is connected to the set input of the flip flop 178. The set output of the flip flop 178 is connected to the set input of the flip flop 179. The set output of the flip flop 179 is connected to the set input of the flip flop 181. The set output of the flip flop 181 is connected to the set input of the flip flop 182. The reset output of the flip flop 182 is connected to a second input of the AND gate 174 via leads 184 and 185, and is connected to a third input of the AND gate 173 via the lead 184 and a lead 186. The output of the AND gate 174 is connected to an output terminal 187 via a lead 188. The output terminal 187 is connected to the end data checking circuit 95 of FIG. 4.

In FIG. 7, a signal from the addendum detecting flip flop 99, supplied to the input terminal 171, energizes the circuit, and said circuit counts the signals supplied to the input terminal 172 from the skew eliminating buffer 57. The skew eliminating buffer 57 supplies one signal for the data of one byte. When the byte counter of FIG. 7 counts to a constant value, or after the termination of a predetermined period of time, the circuit stops transmitting signals to the end data checking circuit 95 via the output terminal 187.

Figure 8:
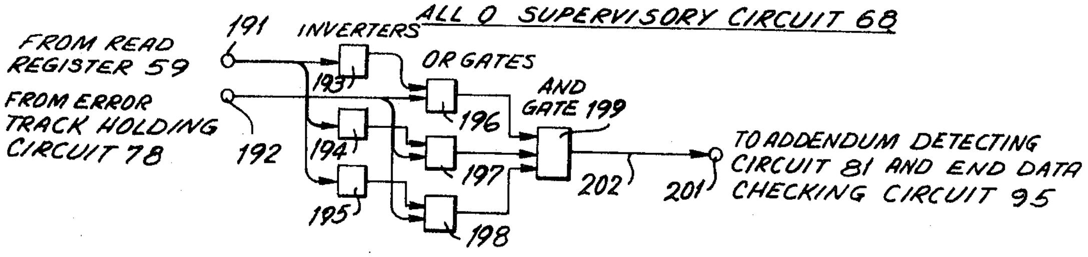
FIG. 8 is a block diagram of an all 0 supervisory circuit which may be utilized in the magnetic tape unit reading system of FIG. 4.

FIG. 8 illustrates an embodiment of an all 0 supervisory circuit which may be utilized as the all 0 supervisory circuit 68 of FIG. 4. In FIG. 8, the read register 59 of FIG. 4 is connected to an input terminal 191. The error track holding circuit 78 is connected to an input terminal 192. The input terminal 191 is connected in common to the input of each of a plurality of inverters 193, 194 and 195. The input terminal 192 is connected in common to a first input of each of a plurality of OR gates 196, 197 and 198. The output of each of the inverters 193, 194 and 195 is connected to the other input of a corresponding one of each of the OR gates 196, 197 and 198.

The output of the OR gate 196 is connected to a first input of an AND gate 199. The output of the OR gate 197 is connected to a second input of the AND gate 199. The output of the OR gate 198 is connected to a third input of the AND gate 199. The output of the AND gate 199 is connected to an output terminal 201 via a lead 202. The output terminal 201 is connected to the addendum detecting circuit 81 of FIG. 4 and to the end data checking circuit 95 of FIG. 4.

In FIG. 8, when 1 signals are not supplied from the read register 59 to the input terminal 191, that is, when there is no 1 signal in one column, and when the signals from the read register 59 are not all 0 and the track of the portion where the signal is not 0 is held by the error track holding circuit 78, the all 0 supervisory circuit 68 of FIG. 8 ignores the error track and transfers signals to the AND gate 199 via the OR gates 196, 197 and 198. The AND gate 199 transfers the signals to the addendum detecting circuit 81 and to the end data checking circuit 95.

Figure 9:
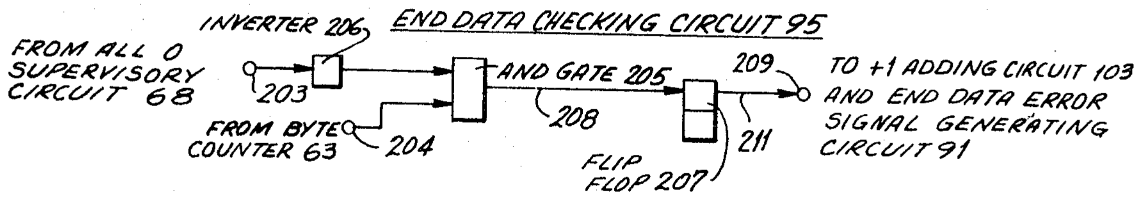
FIG. 9 is a block diagram of an end data checking circuit which may be utilized in the magnetic tape unit reading system of FIG. 4.

FIG. 9 shows an embodiment of an end data checking circuit which may be utilized as the end data checking circuit 95 of FIG. 4. In FIG. 9, the all 0 supervisory circuit 68 of FIG. 4 is connected to an input terminal 203 and the byte counter 63 is connected to an input terminal 204. The input terminal 203 is connected to a first input of an AND gate 205 via an inverter 206. The input terminal 204 is connected to a second input of the AND gate 205. The output of the AND gate 205 is connected to the set input of a flip flop 207 via a lead 208. The set output of the flip flop 207 is connected to an output terminal 209 via a lead 211. The output terminal 209 is connected to the +1 adding circuit 103 of FIG. 4 and to the end data error signal generating circuit 91 of FIG. 4.

In FIG. 9, after the all 1 and all 0 signals regarded as the addendum by the addendum detecting circuit 81, data is read successively and transferred successively by the read register 59, and the all 0 supervisory circuit 68 determines whether or not such data is all 0. The end data checking circuit 95 determines whether or not the all 0 signals are read until a predetermined number of bytes is reached, or until a predetermined period of time elapses, to determine whether or not the all 1 and all 0 signals are the actual addendum.

In FIG. 9, if a signal other than the all 0 signal is read before a predetermined number of bytes is reached, or within a predetermined period of time, no signal is transmitted from the all 0 supervisory circuit 68 (FIG. 4), so that a 1 signal is supplied to the AND gate 205 by the inverter 206. Another signal is transmitted by the byte counter 63 (FIG. 4), so that the AND gate 205 is switched to its conductive condition. When the AND gate is in its conductive condition, it sets the flip flop 207. When the flip flop 207 is set, it transmits signals to the +1 adding circuit 103 of FIG. 4 and to the end data error signal generating circuit 91 of FIG. 4.

Figure 10:
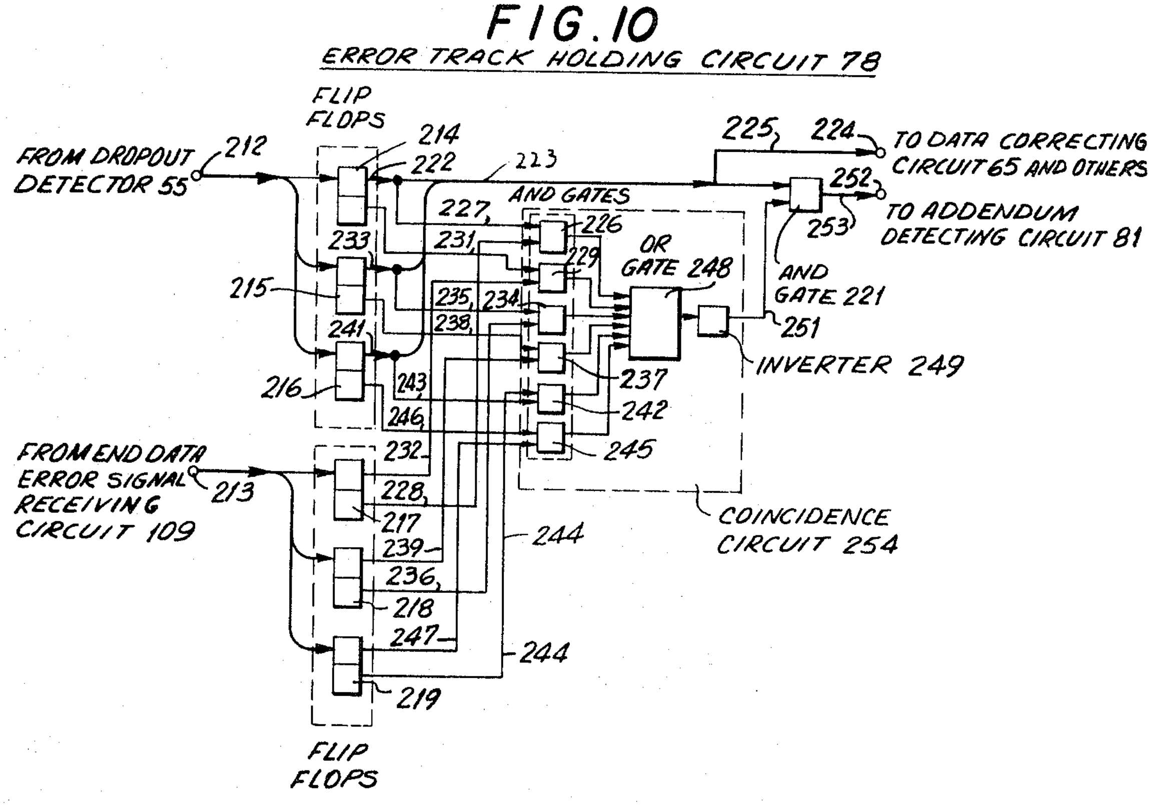
FIG. 10 is a block diagram of an error track holding circuit which may be utilized in the magnetic tape unit reading system of FIG. 4.

FIG. 10 illustrates an embodiment of an error track holding circuit which may be utilized as the error track holding circuit 78 of FIG. 4. In FIG. 10, the dropout detector 55 of FIG. 4 is connected to an input terminal 212. The end data error signal receiving circuit 109 is connected to an input terminal 213. The input terminal 212 is connected in common to the set input of each of a plurality of flip flops 214, 215 and 216. The input terminal 213 is connected in common to the set input of each of a plurality of flip flops 217, 218 and 219. The set output of the flip flop 214 is connected to a first input of an AND gate 221 via leads 222 and 223, to an output terminal 224 via the leads 222 and 223 and a lead 225, and to a first input of an AND gate 226 via the lead 222 and a lead 227. The reset output of the flip flop 217 is connected to a second input of the AND gate 226 via a lead 228.

The reset output of the flip flop 214 is connected to a first input of an AND gate 229 via a lead 231. The set output of the flip flop 217 is connected to a second input of the AND gate 229 via a lead 232. The set output of the flip flop 215 is connected to the first input of the AND gate 221 via a lead 233 and the lead 223, to the output terminal 224 via the leads 233, 223 and 225, and to a first input of an AND gate 234 via the lead 233 and a lead 235. The reset output of the flip flop 218 is connected to another input of the AND gate 234 via a lead 236. The reset output of the flip flop 215 is connected to a first input of an AND gate 237 via a lead 238. The set output of the flip flop 218 is connected to another input of the AND gate 238 via a lead 239.

The set output of the flip flop 216 is connected to the first input of the AND gate 221 via a lead 241 and the lead 223, to the output terminal 224 via the leads 241, 223 and 225, and to a first input of an AND gate 242 via the lead 241 and a lead 243. The reset output of the flip flop 219 is connected to a second input of the AND gate 242 via a lead 244. The reset output of the flip flop 216 is connected to a first input of an AND gate 245 via a lead 246. The set output of the flip flop 219 is connected to a second input of the AND gate 245 via a lead 247. The outputs of the AND gates 226, 229, 234, 237, 242 and 245 are connected to corresponding inputs of an OR gate 248. The output of the OR gate 248 is connected to a second input of the AND gate 221 via an inverter 249 and a lead 251. The output of the AND gate 221 is connected to an output terminal 252 via a lead 253. The data correcting circuit 65, the all 0 supervisory circuit 68, the all 1 supervisory circuit 76 and the end data error signal generating circuit 91 of FIG. 4 are all connected to the output terminal 224. The addendum detecting circuit 81 of FIG. 4 is connected to the output terminal 252.

In FIG. 10, when a dropout in the read data is detected by the dropout detector 55 of FIG. 4, it sets the flip flop of the group of flip flops 214, 215 and 216 corresponding to the track in which the dropout occurs. The end data error signal receiving circuit 109 of FIG. 4 sets a flip flop of the group of flip flops 217, 218 and 219 corresponding to error track data transmitted from the central processor unit (FIG. 2). The AND gates 226, 229, 234, 237, 242 and 245, the OR gate 248 and the inverter 249 function as a coincidence circuit 254.

The coincidence circuit 254 determines whether or not there is coincidence of the two groups of flips flops 214, 215, 216 and 217, 218, 219. If there is such coincidence, the coincidence circuit 254 transmits a signal to the addendum detecting circuit 81, which signal instructs said addendum detecting circuit to determine the addendum by the content of the error data holding circuit 112 (FIG. 4). If a dropout is detected by the dropout detector 55, during the reading of data, the track in which the dropout occurs, that is, the error track, is indicated by the corresponding flip flop of the group of flip flops 214, 215 and 216 being set. The error track data is transmitted to the data correcting circuit 65, the all 0 supervisory circuit 68, the all 1 supervisory circuit 76 and the end data error signal generating circuit 91 via the output terminal 224.

Figure 11:
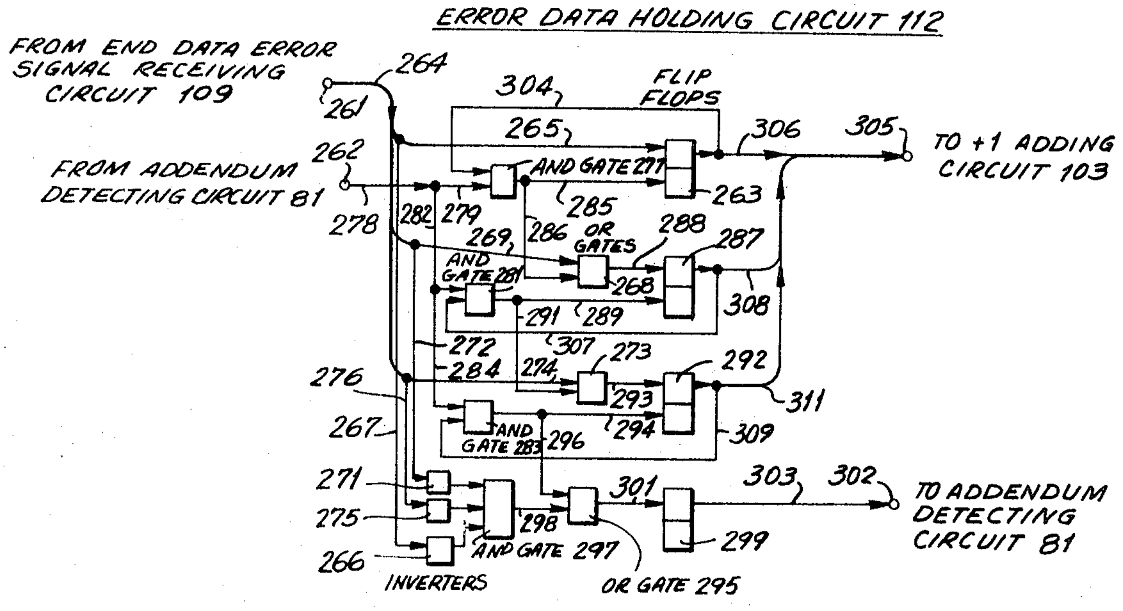
FIG. 11 is a block diagram of an error data holding circuit which may be utilized in the magnetic tape unit reading system of FIG. 4.

FIG. 11 shows an embodiment of an error data holding circuit which may be utilized as the error data holding circuit 112 of FIG. 4. In FIG. 11, the end data error signal receiving circuit 109 of FIG. 4 is connected to an input terminal 261. The addendum detecting circuit 81 of FIG. 4 is connected to an input terminal 262. The input terminal 261 is connected to the set input of a flip flop 263 via leads 264 and 265, and to the input of an inverter 266 via the leads 264 and a lead 267. The input terminal 261 is connected to a first input of an OR gate 268 via the leads 264 and a lead 269, and to the input of an inverter 271 via the leads 264 and a lead 272. The input terminal 261 is connected to a first input of an OR gate 273 via the leads 264 and a lead 274, and to the input of an inverter 275 via the leads 264 and a lead 276. The input terminal 262 is connected to a first input of an AND gate 277 via leads 278 and 279, to a first input of an AND gate 281 via the lead 278 and a lead 282, and to a first input of an AND gate 283 via the leads 278 and 282 and a lead 284.

The output of the AND gate 277 is connected to the reset input of the flip flop 263 via a lead 285, and is connected to a second input of the OR gate 268 via a lead 286. The output of the OR gate 268 is connected to the set input of a flip flop 287 via a lead 288. The output of the AND gate 281 is connected to the reset input of the flip flop 287 via a lead 289, and to a second input of the OR gate 273 via a lead 291. The output of the OR gate 273 is connected to the set input of a flip flop 292 via a lead 293. The output of the AND gate 283 is connected to the reset input of the flip flop 292 via a lead 294, and to a first input of an OR gate 295 via a lead 296.

The outputs of the inverters 271, 275 and 266 are connected to corresponding first, second and third inputs of an AND gate 297. The output of the AND gate 297 is connected to a second input of the OR gate 295 via a lead 298. The output of the OR gate 295 is connected to the set input of a flip flop 299 via a lead 301. The set output of the flip flop 299 is connected to an output terminal 302 via a lead 303. The set output of the flip flop 263 is connected to a second input of the AND gate 277 via a feedback lead 304, and is connected to an output terminal 305 via a lead 306. The set output of the flip flop 287 is connected to a second input of the AND gate 281 via a feedback lead 307, and to the output terminal 305 via a lead 308. The set output of the flip flop 292 is connected to a second input of the AND gate 283 via a feedback lead 309, and is connected to the output terminal 305 via a lead 311. The output terminal 305 is connected to the +1 adding circuit 103 of FIG. 4. The output terminal 302 is connected to the addendum detecting circuit 81 of FIG. 4.

The error data holding circuit 112 of FIG. 11 may also be called a −1 subtracting circuit, or circuit for subtracting 1. In FIG. 11, one of the flip flops 263, 287, 292 and 299 is set in accordance with the content of set error data transmitted from the central processor unit via the end data error signal receiving circuit 109 (FIG. 4). The error data is provided by the +1 adding circuit 103 (FIG. 4) due to erroneous detection of addenda in the read data. The number of erroneous detections of the addendum determines which of the flip flops 263, 287, 292 and 299 is set. If there are three erroneous detections, the flip flop 263 is set. If there are two erroneous detections, the flip flop 287 is set.

During the rereading operation, each time an all 1 or an all 0 signal regarded as the addendum is transmitted from the addendum detecting circuit 81, the flip flop 263 is reset and the flip flop 287 is set, or the flip flop 287 is reset and the flip flop 292 is set, or the flip flop 292 is reset and the flip flop 299 is set. In the rereading, the previously erroneously detected addendum is ignored and the reading is performed. When a signal supplied to the error data holding circuit 112 indicates that all 1 and all 0 signals of a number greater than the number stored in the error data holding circuit has been detected by the addendum detecting circuit 81, said addendum detecting circuit is advised that the all 1 and all 0 signals are new data, different from the old data.

The set error data from the central processor unit is first stored in the error data holding circuit 112, itself. However, since 1 is subtracted each time an all 1 or an all 0 signal is detected in the rereading, the first set error data cannot be held or stored. The set error data is thus transmitted to the +1 adding circuit 103, which stores the set error data.

Figure 12:
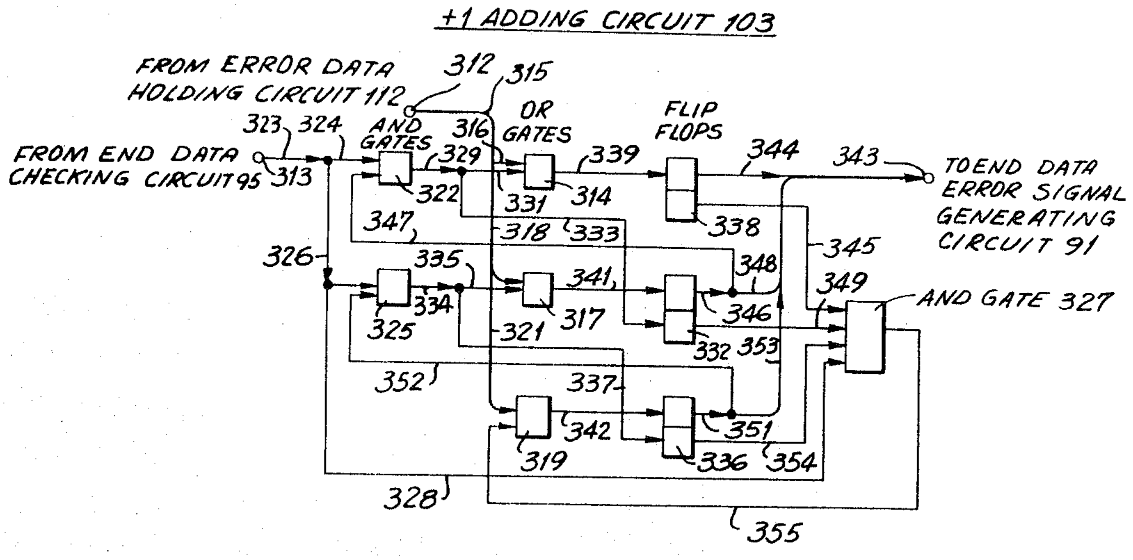
FIG. 12 is a block diagram of a +1 adding circuit which may be utilized in the magnetic tape unit reading system of FIG. 4.

FIG. 12 illustrates an embodiment of a +1 adding circuit which may be utilized as the +1 adding circuit 103 of FIG. 4. In FIG. 12, the error data holding circuit 112 of FIG. 4 is connected to an input terminal 312. The end data checking circuit 95 of FIG. 4 is connected to an input terminal 313. The input terminal 312 is connected to a first input of an OR gate 314 via leads 315 and 316, to a first input of an OR gate 317 via the lead 315 and a lead 318, and to a first input of an OR gate 319 via the leads 315 and 318 and a lead 321. The input terminal 313 is connected to a first input of an AND gate 322 via leads 323 and 324, to a first input of an AND gate 325 via the lead 323 and a lead 326, and to a first input of an AND gate 327 via the leads 323 and 326 and a lead 328.

The output of the AND gate 322 is connected to a second input of the OR gate 314 via a lead 329 and a lead 331, and to the reset input of a flip flop 332 via the lead 329 and a lead 333. The output of the AND gate 325 is connected to a second input of the OR gate 317 via leads 334 and 335, and to the reset input of a flip flop 336 via the lead 334 and a lead 337. The output of the OR gate 314 is connected to the set input of a flip flop 338 via a lead 339. The output of the OR gate 317 is connected to the set input of the flip flop 332 via a lead 341. The output of the OR gate 319 is connected to the set input of the flip flop 336 via a lead 342.

The set output of the flip flop 338 is connected to an output terminal 343 via a lead 344. The reset output of the flip flop 338 is connected to a second input of the AND gate 327 via a lead 345. The set output of the flip flop 332 is connected to a second input of the AND gate 322 via leads 346 and 347, and is connected to the output terminal 343 via the lead 346 and a lead 348. The reset output of the flip flop 332 is connected to a third input of the AND gate 327 via a lead 349. The set output of the flip flop 336 is connected to a second input of the AND gate 325 via leads 351 and 352, and to the output terminal 343 via the lead 351 and a lead 353. The reset output of the flip flop 336 is connected to a fourth input of the AND gate 327 via a lead 354. The output of the AND gate 327 is connected to a second input of the OR gate 319 via a lead 355. The end data error signal generating circuit 91 of FIG. 4 is connected to the output terminal 343.

The +1 adding circuit 103 of FIG. 12 stores or holds the content of the error data holding circuit 112 transmitted thereto. When the end data checking circuit 95 determines, during the rereading, that all 1 and all 0 signals newly received are not in the addendum, +1 is added and an error signal or error data is transmitted to the end data error signal generating circuit 91. The +1 adding circuit 103 of FIG. 12 detects all 1 and all 0 data in the first reading. When it is determined that the all 1 and all 0 data is not in the addendum, the AND gate 327 is switched to its conductive condition by the reset signals at the reset outputs of the flip flops 338, 332 and 336. The signal of the end data checking circuit 95 is then transferred by the AND gate 327.

When the AND gate 327 transfers a signal, said signal is supplied to the OR gate 319 and sets the flip flop 336. The flip flop 336 thus stores a 1. Next, in the rereading, all 1 and all 0 data different from the all 1 and all 0 data are read. When it is determined that such data is not the addendum, the AND gate 325 is switched to its conductive condition by the set output of the flip flop 336 and the signal transmitted from the end data checking circuit 95. When the AND gate 325 is switched to its conductive condition, it sets the flip flop 332 via the OR gate 317, and 2 is stored in said flip flop. The aforedescribed operation is repeated.

Figure 13:
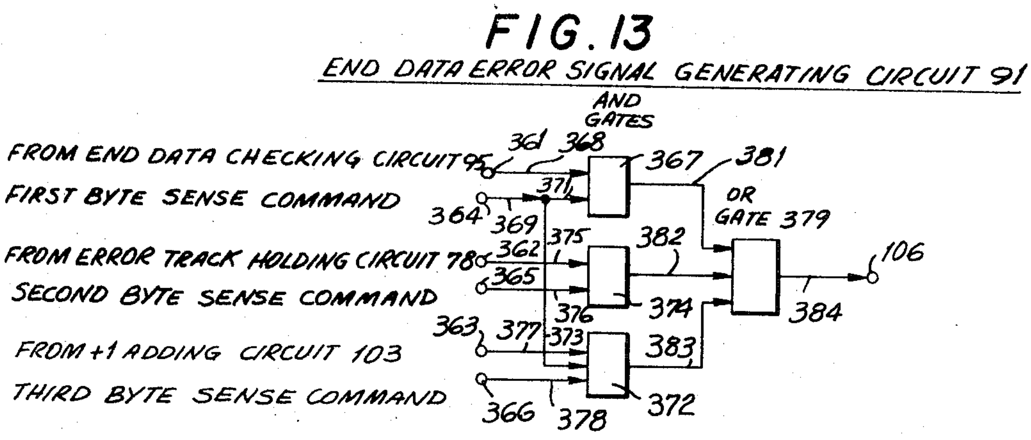
FIG. 13 is a block diagram of an end data error signal generating circuit which may be utilized in the magnetic tape unit reading system of FIG. 4.

FIG. 13 shows an embodiment of an end data error signal generating circuit which may be utilized as the end data error signal generating circuit 91 of FIG. 4. In FIG. 13, the end data checking circuit 95 of FIG. 4 is connected to an input terminal 361. The error track holding circuit 78 of FIG. 4 is connected to an input terminal 362. The +1 adding circuit 103 of FIG. 4 is connected to an input terminal 363. The first byte sense command is supplied to an input terminal 364. The second byte sense command is supplied to an input terminal 365. The third byte sense command is supplied to an input terminal 366. The input terminal 361 is connected to a first input of an AND gate 367 via a lead 368. The input terminal 364 is connected to a second input of the AND gate 367 via leads 369 and 371, and to a first input of an AND gate 372 via the lead 369 and a lead 373.

The input terminal 362 is connected to a first input of an AND gate 374 via a lead 375. The input terminal 365 is connected to a second input of the AND gate 374 via a lead 376. The input terminal 363 is connected to a second input of the AND gate 372 via a lead 377. The input terminal 366 is connected to a third input of the AND gate 372 via a lead 378. The output of the AND gate 367 is connected to a first input of an OR gate 379 via a lead 381. The output of the AND gate 374 is connected to a second input of the OR gate 379 via a lead 382. The output of the AND gate 372 is connected to a third input of the OR gate 379 via a lead 383. The output of the OR gate 379 is connected to the second output terminal 106 of FIG. 4 via a lead 384.

The end data error signal generating circuit 91 of FIG. 13 arranges data transmitted to the central processor unit as an error in the end data system. The end data error signal generating circuit 91 provides the end of a sense command transmitted from the central processor unit subsequent to a read command and the signal from the end data checking circuit 95, the error track holding circuit 78 or the +1 adding circuit 103, and thereby transmits an end data error signal to the central processor unit via the OR gate 379 and the second output terminal 106.

Figure 14:
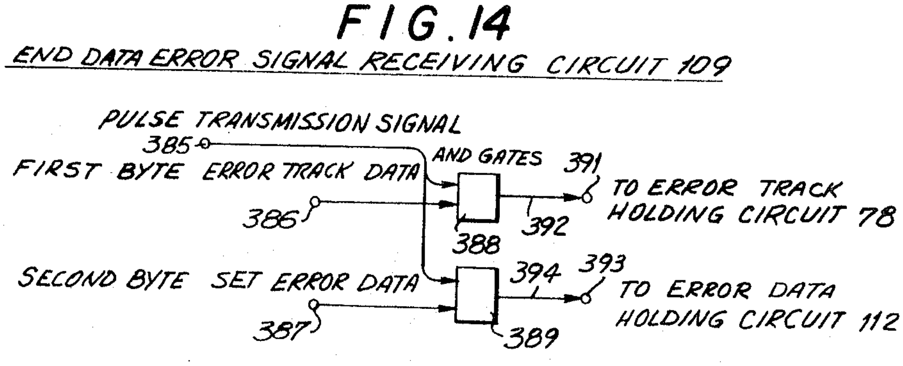
FIG. 14 is a block diagram of an end data error signal receiving circuit which may be utilized in the magnetic tape unit reading system of FIG. 4.

FIG. 14 illustrates an embodiment of an end data error signal receiving circuit which may be utilized as the end data error signal receiving circuit 109 of FIG. 4. In FIG. 14, a pulse transmission signal is supplied to an input terminal 385. First byte error track data is supplied to an input terminal 386. Second byte set error data is supplied to an input terminal 387. The input terminal 385 is connected in common to a first input of each of a pair of AND gates 388 and 389. The input terminal 386 is connected to a second input of the AND gate 388. The input terminal 387 is connected to a second input of the AND gate 389. The output of the AND gate 388 is connected to an output terminal 391 via a lead 392. The output of the AND gate 389 is connected to an output terminal 393 via a lead 394. The error track holding circuit 78 of FIG. 4 is connected to the output terminal 391. The error data holding circuit 112 of FIG. 4 is connected to the output terminal 393.

The end data error signal receiving circuit 109 of FIG. 14 transmits error data such as, for example, set error data transmitted prior to the read command from the central processor unit, in the error track holding circuit 78 and in the error data holding circuit 112. That is, the error track data is set in the error track holding circuit 78 and is set in the error data holding circuit 112 by supplying signals to the AND gates 388 and 389 prior to the transmission of the read command for rereading.

Figure 15:
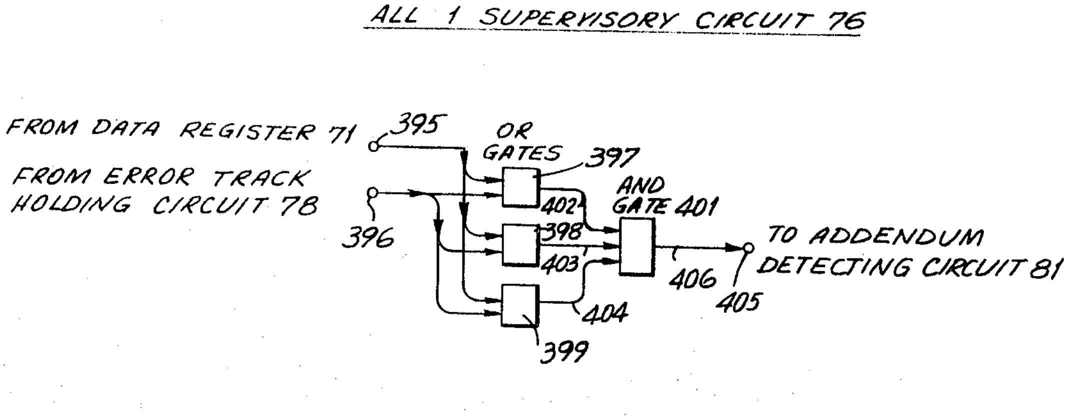
FIG. 15 is a block diagram of an all 1 supervisory circuit which may be utilized in the magnetic tape unit reading system of FIG. 4.

FIG. 15 shows an embodiment of an all 1 supervisory circuit which may be utilized as the all 1 supervisory circuit 76 of FIG. 4. In FIG. 15, the data register 71 of FIG. 4 is connected to an input terminal 395. The error track holding circuit 78 of FIG. 4 is connected to an input terminal 396. The input terminal 395 is connected in common to a first input of each of a plurality of OR gates 397, 398 and 399. The input terminal 396 is connected in common to a second input of each of the OR gates 397, 398 and 399. The output of the OR gate 397 is connected to a first input of an AND gate 401 via a lead 402. The output of the OR gate 398 is connected to a second input of the AND gate 401 via a lead 403. The output of the OR gate 399 is connected to a third input of the ANd gate 401 via a lead 404. The output of the AND gate 401 is connected to an output terminal 405 via a lead 406. The addendum detecting circuit 81 of FIG. 4 is connected to the output terminal 405.

In FIG. 15, when the data register 71 does not supply 0 signals to the input terminal 395, that is, when there is no 0 signal in one column, and when the signals from said data register are not all 1 , and the track of the portion wherein the signal is not 1 is held by the error track holding circuit 78, the all 1 supervisory circuit 76 of FIG. 15 ignores the error track and supplies signals to the AND gate 401 via the OR gates 397, 398 and 399. The AND gate 401 is switched to its conductive condition and transfers the signals to the addendum detecting circuit 81.

The operation of the magnetic tape unit reading system of the invention, as illustrated in FIG. 4, and with regard to the flow of signals therethrough, is hereinafter explained. When a read command is transmitted from the central processor unit, the reading is initiated or commenced, and read data supplied to the first input terminal 51 of FIG. 4 is transferred to the central processor unit via the pulse shaper 52, the skew eliminating buffer 57, the read register 59, the data correcting circuit 65, the data register 71 and the first output terminal 73.

It is assumed that all 1 data and all 0 data is supplied to the first input terminal 51. The all 1 data is supplied to the data register 71 and the all 0 data is supplied to the read register 59. The all 1 data is supplied to the all 1 supervisory circuit 76 and the all 0 data is supplied to the all 0 supervisory circuit 68. The all 1 supervisory circuit 76 supplies the all 1 data to the addendum detecting circuit 81 and the all 0 supervisory circuit 68 supplies the all 0 data to said addendum detecting circuit.

If the addendum detecting circuit 81 determines coincidence of the all 1 data and the all 0 data, said addendum detecting circuit transmits signals to the error data holding circuit 112. Since the reading is the first reading, however, no set error data is transmitted from the central processor unit to the error data holding circuit 112. The signals are therefore immediately supplied to the addendum detecting circuit 81, the AND gate 159 is switched to its conductive condition and sets the addendum detecting flip flop 99 (FIG. 6).

When the addendum detecting flip flop 99 is set by a signal transferred by the AND gate 159 (FIG. 6) of the addendum detecting circuit 81, the byte counter 63 is operated by a signal transmitted for each data of one byte supplied at the first input terminal 51 and transferred through the skew eliminating buffer 57. When the byte counter 63 has counted a specified number of bytes, the end data checking circuit 95 determines whether or not the all 0 data was received while the specified number of bytes were received. If it is determined that data other than the all 0 signals were received while the specified number of bytes were received, the flip flop 207 of the end data checking circuit 95 (FIG. 9) is set. When the flip flop 207 (FIG. 9) of the end data checking circuit 95 is set, a signal is transmitted to the +1 adding circuit 103 and to the end data error signal generating circuit 91 via the output terminal 209 (FIG. 9).

Since the reading is the first reading, no error data is held or stored by the error data holding circuit 112. Therefore, 1 is set in the +1 adding circuit 103. Furthermore, the 1 signal, the end data error signal and the signal indicating the error track detected by the dropout detector 55 are transmitted from the end data error signal generating circuit 91 to the central processor unit via the second output terminal 106. When the central processor unit receives the signal indicating the detection from the magnetic tape unit, said central processor unit transmits a reread command.

Prior to the execution of the reread command, the end data error signal is transmitted from the central processor unit via the second input terminal 108 to the end data error signal receiving circuit 109. The error track data is transmitted from the end data error signal receiving circuit 109 to the error track holding circuit 78 via the end data error signal. Furthermore, the error data 1 is transmitted from the end data error signal receiving circuit 109 to the error data holding circuit 112 by the end data error signal.

The rereading of the magnetic tape is then instituted or commenced. If there is all 1 data or all 0 in the read data, the addendum detecting circuit 81 determines, by the content of the error track holding circuit 78 and the content of the error data holding circuit 112, whether or not the all 1 data or the all 0 data is an addendum. That is, the previous error track is collated with the present error track in which a dropout was detected by the error track holding circuit 78 to determine whether or not the all 1 data or the all 0 data are identical with the data read in the first reading.

If it is determined that 1 is held or stored in the error data holding circuit 112, the all 1 or the all 0 data is regarded not as the addendum, but as the normal data, and the next-succeeding data is continuously read. If the all 1 data or the all 0 data are reread, or read again, however, the addendum detecting circuit 81 determines whether or not the data is an addendum, as in the first reading. If it is determined that the data is not an addendum, 1 is added to the error data 1 transmitted from the central processor unit to the error data holding circuit 112 in the +1 adding circuit 103 to provide 2 in the rereading. The end data error signal is then transmitted from the end data checking circuit 95 and the error track data is transmitted from the error track holding circuit 78 to the central processor unit via the second output terminal 106.

The rereading is then performed again. The rereading is thus repeated several times until the actual addendum is detected, thereby eliminating the possibility of terminating the reading during the presence of data recorded on the magnetic tape. Neither the +1 adding circuit 103 nor the error data holding circuit 112 can hold or store more than 3. More error data than corresponds to 3, however, may of course be precessed by increasing the number of flip flops 263, 287, 292 and 299 (FIG. 11) of the error data holding circuit 112 or the number of flip flops 338, 332 and 336 (FIG. 12) of the +1 adding circuit 103.

While the invention has been described by means of a specific example and in a specific embodiment, we do not wish to be limited thereto, for obvious modifications will occur to those skilled in the art without departing from the spirit and scope of the invention.

We claim:

1. A magnetic tape unit reading system comprising input means for supplying read data; all 0 byte detecting means having an input coupled to the input means and outputs for detecting from the read data a byte having data bits which are all 0; all 1 byte detecting means having an input coupled to the input means and an output for detecting from the read data a byte having data bits which are all 1; addendum detecting means having inputs connected to the outputs of the all 0 byte detecting means and the all 1 byte detecting means and outputs for detecting all 0 and all 1 bytes as a virtual addendum to the read data by detecting the all 0 and all 1 bytes of the all 0 byte detecting means and the all 1 byte detecting means; timing means having an input connected to an output of the addendum detecting means and an output for timing a specific predetermined period of time starting with the detection of the data as a virtual addendum by the addendum detecting means; byte counting means having an input connected to the timing means, an input coupled to the input means and an output for counting the bytes of the read data; end data checking means having an input connected to the output of the byte counting means, an input connected to an output of the all 0 byte detecting means and outputs for determining if an all 0 byte is detected by the all 0 byte detecting means during the specific predetermined period of time; and output means connected to the output of the end data checking means.

2. A magnetic tape unit reading system as claimed in claim 1, further comprising error data means for supplying error data, +1 adding means having an input connected to an output of the end data checking means, an input coupled to the error data means and an output connected to the output means for adding 1 to the error data if the addendum detecting means fails to detect all 0 and all 1 bytes as a virtual addendum and for storing the new sum when the end data checking means determines that no all 0 byte is detected by the all 0 byte detecting means during the specific predetermined period of time, dropout detecting means having an input connected to the input means and an output for detecting a dropout on a magnetic tape when the read data supplied by the input means is read from a magnetic tape, error track holding means having an input connected to the output of the dropout means, an input coupled to the error data means and an output connected to an input of the addendum detecting means, an input of the all 0 byte detecting means and an input of the all 1 byte detecting means for storing data of a portion where there is a dropout on a magnetic tape and for determining coincidence of data of a portion having a dropout detected by the dropout detecting means and the error data supplied by the error data means, error data holding means having an input coupled to the error data means, an input connected to the addendum detecting means, and output connected to the addendum detecting means and an output connected to an input of the +1 adding means for storing error data supplied by the error data means and data from the error track holding means and for subtracting 1 from the error data each time the addendum detecting means detects all 0 and all 1 bytes as a virtual addendum.

3. A magnetic tape unit reading system as claimed in claim 2, wherein the output means comprises end data error signal generating means having an input connected to an output of the end data checking means, an input connected to the output of the error track holding means, an input connected to the output of the +1 adding means and an output for transmitting the signal of the +1 adding means and the detected error track signal of the dropout detector for processing and return to the error data means as an end data error signal.

4. A magnetic tape unit reading system as claimed in claim 3, wherein the error track holding means comprises first memory means and second memory means for storing the track having a dropout, said first memory means storing the number of the track having a dropout and said second memory means storing error data of the portion having the dropout as transmitted by the end data error signal generating means and returned to the error data means.

5. A magnetic tape unit reading system as claimed in claim 3, wherein the error data holding means comprises memory means for storing signals from the addendum detecting means and data from the error data means, said memory means storing data received directly from the error data means and including means for making the content of said memory means 1 if a signal is received from the addendum detecting means when no data is stored in said memory means and means for adding 1 to the content of said memory means and for storing the result of the addition in said memory means if a signal is received from the addendum detecting means when specified data is stored in said memory means.

* * * * *